United States Patent [19]
Matsuzaki et al.

[11] 3,782,254
[45] Jan. 1, 1974

[54] APPARATUS FOR INDICATING EXPOSURE CONDITIONS OF CAMERAS EQUIPPED WITH ELECTRIC SHUTTER MECHANISMS

[75] Inventors: Soichiro Matsuzaki; Isao Kondo, both of Tokyo, Japan

[73] Assignee: Olympus Optical Co., Ltd., Tokyo, Japan

[22] Filed: Aug. 29, 1972

[21] Appl. No.: 284,464

[30] Foreign Application Priority Data
Sept. 3, 1971 Japan................................ 46/68165
Sept. 3, 1971 Japan................................ 46/68166
Nov. 17, 1971 Japan................................ 46/92062
Apr. 4, 1972 Japan................................ 47/33744

[52] U.S. Cl............................. 95/10 CE, 95/10 CT
[51] Int. Cl......................... G03b 17/18, G03b 9/62
[58] Field of Search...................... 95/10 CE, 10 CT

[56] References Cited
UNITED STATES PATENTS
3,397,629   8/1968   Mori et al......................... 95/10 CT
3,651,744   3/1972   Okada............................. 95/10 CT

*Primary Examiner*—Joseph F. Peters, Jr.
*Assistant Examiner*—Russell E. Adams, Jr.
*Attorney*—Solon B. Kemon et al.

[57] ABSTRACT

In apparatus for indicating exposure conditions of a photographic camera equipped with an automatic exposure control device for opening the shutter at a shutter speed corresponding to the quantity of light received from an object, there are provided first and second electric pulse generating circuits for producing first and second reference time pulses having pulse widths corresponding to the maximum and minimum shutter speeds respectively, comparator means to compare the pulse widths with the width of the output pulse from the automatic exposure control device, and indicating means responsive to the output from the comparator means to indicate adequate and inadequate exposure conditions.

7 Claims, 12 Drawing Figures

APPARATUS FOR INDICATING EXPOSURE CONDITIONS OF CAMERAS EQUIPPED WITH ELECTRIC SHUTTER MECHANISMS

This invention relates to apparatus for indicating the exposure conditions of a photographic camera equipped with an electric shutter mechanism.

Failures in taking good pictures can be efficiently prevented when photographing objects with a photographic camera including means for automatically determining a proper exposure time if the user can confirm beforehand whether the exposure conditions are suitable for a particular object or not. To this end, an exposure alarming device has been used. However, with the prior art device only when the exposure conditions are not adequate, an indication representing such adverse conditions is made in a finder, for example, and where the exposure conditions are correct no confirmation indication is made showing that the exposure conditions are adequate for the particular object. However, with such a device, even when the voltage of a source which is used to operate the automatic exposure device drops, that is when the automatic exposure device can not operate satisfactorily, no indication is made so that the user can not know such adverse condition and fails to take a good picture.

Accordingly, it is an object of this invention to provide an improved apparatus for indicating the exposure conditions which shows that whether the exposure conditions are adequate or not and can indicate whether the exposure is over or under.

Another object of this invention is to provide an improved indicating apparatus capable of indicating these different exposure conditions with a single indicating lamp.

Still another object of this invention is to provide an improved apparatus for indicating exposure conditions which can be readily combined with a high measuring circuit of a single lens reflex camera of the TTL (through the lens type.

A further object of this invention is to provide an improved apparatus for indicating various exposure conditions of a photographic camera equipted with an electric shutter mechanism which is operated by preferentially determining the shutter speed of the camera.

Briefly stated, in accordance with this invention, there is provided apparatus for indicating exposure conditions of a photographic camera equipped with an electric shutter mechanism, the apparatus comprising a first electric pulse generating circuit which generates a first reference time pulse signal having a pulse width corresponding to a maximum shutter open time at which a trembling camera shake alarm is to be given, a second electric pulse generating circuit which is driven by the output from the first electric pulse generating circuit for generating a second reference time pulse signal having a width corresponding to a limit of the shutter open time at which an alarm for an over exposure condition is to be given, an automatic exposure control circuit which operates in synchronism with the output from the first electric pulse generating circuit to open the shutter of the camera at a speed corresponding to the quantity of light received from an object, a comparator gate circuit which compares the width of the output pulse from the automatic exposure control circuit with those of the output pulses from the first and second electric pulse generating circuits, and means responsive to the output from the comparator gate circuit to indicate adequate and inadequate exposure conditions.

Further objects and advantages of the invention can be more fully understood from the following detailed description taken in conjunction with the accompanying drawings, in which.

Figure 1:
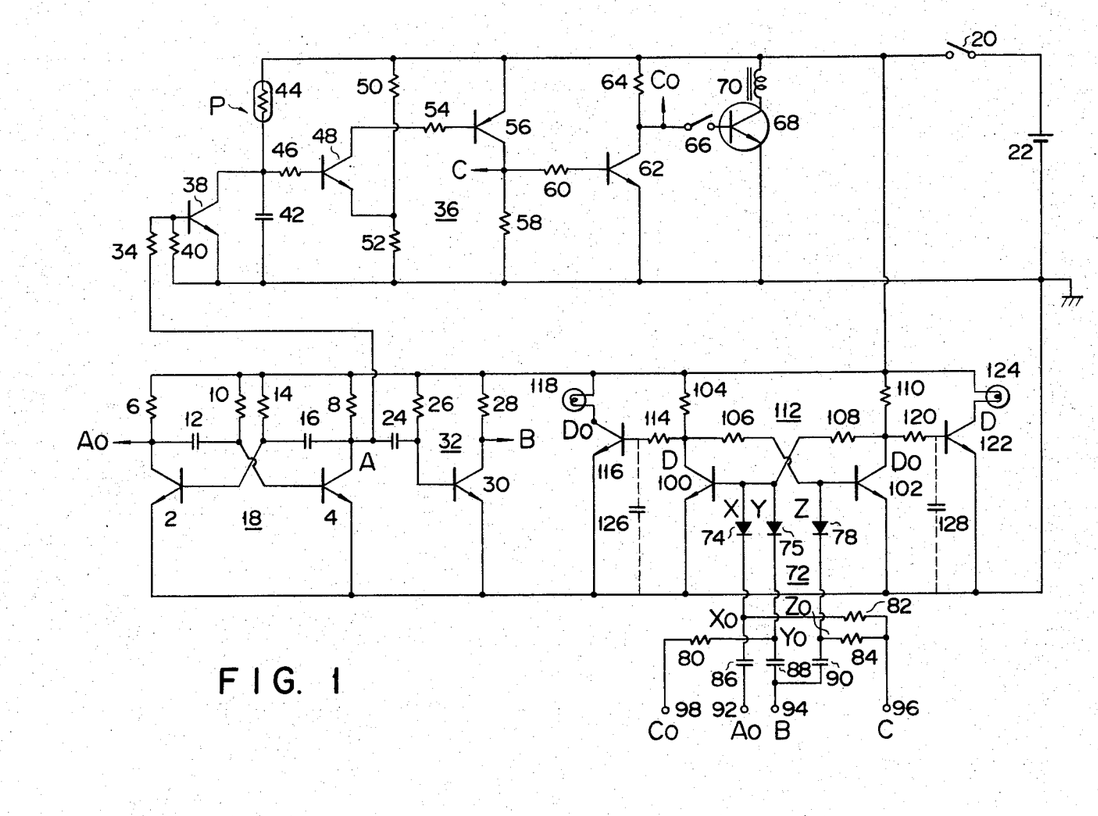
FIG. 1 shows a connection diagram of one embodiment of the apparatus for indicating the exposure conditions embodying the invention.

In a preferred embodiment shown in FIG. 1, an astable multivibrator 18 comprising transistors 2 and 4, resistors 6 and 8, a first time constant circuit including resistor 10 and capacitor 12, and a second time constant circuit including a resistor 14 and a capacitor 16 is connected to be energized from a source of DC supply 22 through a source switch 20. At least one time constant of the two time constants is determined such that the astable multivibrator 18 generates a reference time pulse signal having a width corresponding to the longest shutter open time, that is the maximum limit of opening in which the shutter is operated at the minimum speed and at which an alarm for camera shake should be given. This pulse width is set to 30 milliseconds, for example.

One output of the astable multivibrator 18 is applied from the collector electrode of transistor 4 to a pulse generator 32 comprising a capacitor 24, resistors 26 snd 28 and a transistor 30, which functions to produce a reference time pulse signal having a pulse width corresponding to the shortest shutter open time, that is the minimum limit of opening in which the shutter is operated at the highest speed and at which an alarm for over exposure is to be given. This pulse width is set to 1 millisecond, for example.

This output from the astable multivibrator 18 is also applied from the collector electrode of transistor 4 to the base electrode of a transistor 38 of an automatic exposure control circuit 36 through a resistor 34. Thus base bias potential of transistor 38 is impressed through a resistor 40 and the transistor 38 is connected in parallel with a capacitor 42 which is connected in series with a photoelectric converting element 44 across the DC source 22 to form a time constant circuit for the control circuit 36. The purpose of the automatic exposure control circuit 36 is to open the shutter at a speed corresponding to the quantity of light P reflected by an object and impinging upon the photoelectric converting element 44. The juncture between the capacitor 42 of the time constant circuit and the photoelectric converting element 44 is connected to the base electrode of a transistor 48, the emitter electrode thereof receiving a bias voltage through resistors 50 and 52. The collector electrode of transistor 48 is connected to the base electrode of a transistor 56 through a resistor 54 and the collector electrode of transistor 56 is connected to the negative pole of the source through a resistor 58 and to the base electrode of a transistor 62 through a resistor 60. The collector electrode of transistor 62 is connected to one side of switch 20 through a resistor 64 and to the base electrode of a transistor 68 through a switch 66. The transistor 68 is connected in series with a shutter driving electromagnet 70 across the source 22 via switch 20.

The output $A_0$ from the astable multivibrator 18 which produces a first reference time pulse signal having a pulse width corresponding to the longest shutter open time at which a camera shake alarm should be given and the output B from the pulse generator which produces a second reference time pulse having a width corresponding to the shortest shutter open time at which an over exposure alarm should be given are impressed upon the inputs of a comparator gate circuit 72 together with the outputs C and $C_0$ from the automatic exposure control circuit 36. The comparator gate circuit 72 comprises diodes 74, 76 and 78, resistors 80, 82 and 84 and capacitors 86, 88 and 90 and the signals $A_0$, B, C and $C_0$ are impressed upon its input terminals 92, 94 and 98, respectively. The output from the comparator gate circuit 72 is impressed upon a flip-flop circuit 112 constituted by transistors 100 and 102, and resistors 104, 106, 108 and 110. The anode electrodes of diodes 74 and 76 are connected to the base electrode of transistor 100, whereas the anode electrode of a diode 78 is connected to the base electrode of the transistor 102.

The outputs D and $D_0$ from the flip-flop circuit 112 are respectively applied to a first indicating circuit comprising a resistor 114, a transistor 116 and an over exposure condition alarm indicating lamp 118 which may be red and a second indicating circuit comprising a resistor 120, a transistor 122 and an adequate exposure condition indicating lamp 124 which may be green.

A switch 66 included on the output side of the automatic exposure control circuit 36 is interlocked with a shutter release button (not shown) so that it is closed immediately before the actual exposure when the operator has confirmed the adequate and inadequate exposure conditions displayed by the indicating lamps 118 nad 124.

The apparatus shown in FIG. 1 operates as follows.

Figure 2:
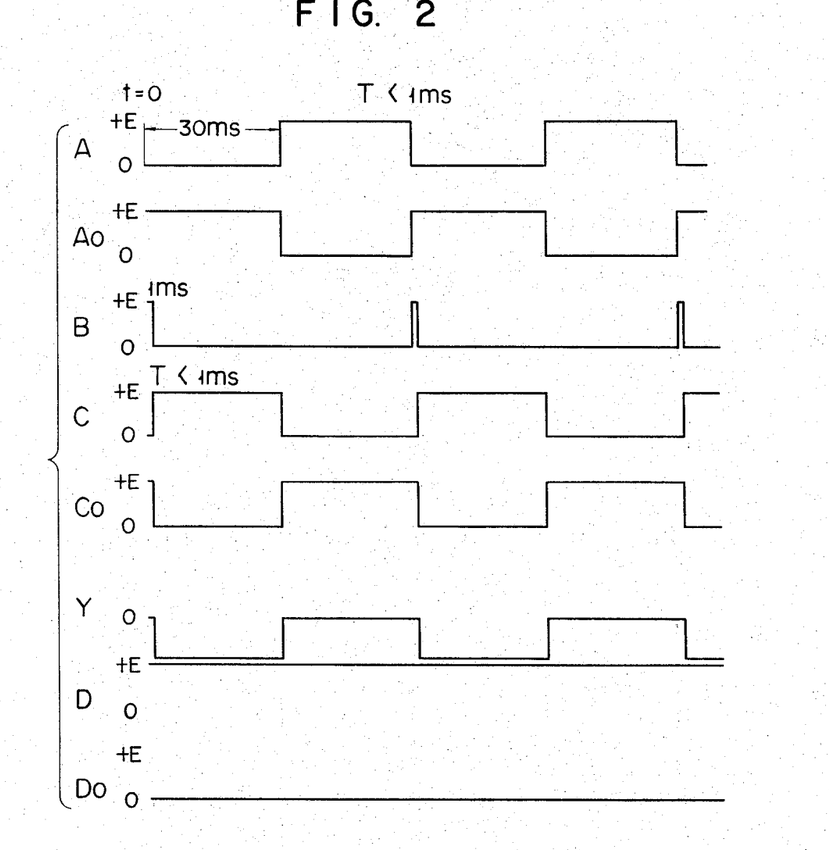
FIGS. 2 to 5 show waveforms helpful to explain the operation of the apparatus shown in FIG. 1.

First, a condition under which the reflected light P from the object and impinging upon the photoelectric converting element 44 is too intense to cause an over exposure, that is the width T of the output pulse $C_0$ from the automatic exposure control circuit 36 is smaller than 1 ms will be considered with reference to FIG. 2. Upon closure of the source switch 20, the astable multivibrator 18 generates a pulse signal having a definite pulse width, i.e., 30 ms. The outputs A and $A_0$ have rectangular waveforms as shown in FIG. 2. When the transistor 4 is turned ON, the capacitor 24 will be charged through resistor 26. When the capacitor 24 is charged to a terminal voltage of about 0.7 volts, current begins to flow through the base electrode of transistor 30 of the pulse generator 32 and the transistor 30 will be quickly turned ON provided that the value of resistor 8 is selected to be about 10 times larger than that of resistor 28. It is possible to produce output B having a pulse width of about 1 ms on the collector electrode of transistor 30 by properly setting the time before transistor 30 is turned ON, such setting can be accomplished by the proper selection of the values of resistor 8 and capacitor 24. This output pulse is used as the reference time pulse for alarming the over exposure condition.

When transistor 4 of the astable multivibrator 18 is turned ON, the potential applied to the base electrode of transistor 38 through resistor 34 decreases, thus turning OFF this transistor. As a result, capacitor 42 of the time constant circuit begins to be charged from the source 42 through the photoelectric converting element 44. After a definite time when the terminal voltage across capacitor 42 reaches the trigger potential of transistor 48, this transistor 48 is turned ON to create a positive potential across its collector load resistor 54, thereby turning ON transistor 56. Upon conduction of transistor 56, an operating bias is impressed upon the base electrode of transistor 62 through the action of resistors 58 and 60 whereby transistor 62 is turned ON. In this manner, output pulses C and $C_0$ of the automatic exposure control circuit 36 which are dephased from each other by 180° and have waveforms shown in FIG. 2 are produced on the emitter electrode of transistor 56 and the collector electrode of transistor 62, respectively.

Pulse signals $A_0$, B, C and $C_0$ produced as above described are applied to terminals 90 to 98, respectively, of the comparator gate circuit 72.

Figure 3:
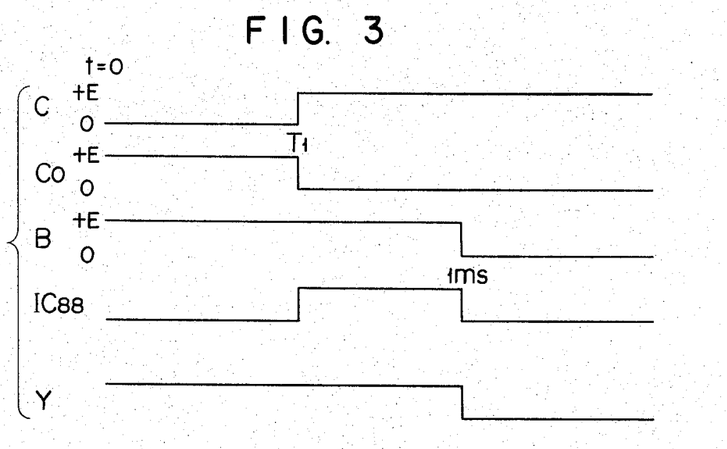

The operation of the comparator gate circuit 72 will be described with reference to FIG. 3 also. Transistor 56 is turend ON after an interval $T_1$ (<1 ms) has elapsed after a time $t = 0$ at which transistor 4 has been rendered ON thus producing output pulses C and $C_0$ having a phase difference of 180°. The pulse width $T_1$ of these pulses is compared with those of pulses A and B in the comparator gate circuit 72. More particularly, to a juncture $X_0$ on the cathode side of diode 74 are applied pulse $A_0$ through a capacitor 86 and pulse C through a resistor 82. During an interval between $t = 0$ and $t = T_1$, since the pulse C is 0 volts, the potential at point $X_0$ is also zero. On the other hand, since pulse $A_0$ is E volts during an interval from $t = 0$ to $t = 30$ ms, the capacitor 86 will be charged such that its terminal 92 will assume a positive voltage. At $t = T_1$, pulse C assumes E volts but since pulse $A_0$ also has a voltage of E volts, the capacitor 86 will discharge through resistors 82 and 58 and the source 22 whereby point $X_0$ and terminal 92 will have the same potential. As a result, no voltage will appear on the juncture X between the anode electrode of diode 74 and the base electrode of transistor 100.

The output B from pulse generator 32 has a value of E volts from $t = 0$ to $t = 1$ ms and then falls to 0 volt so that both outputs $C_0$ and B are equal to E volts during an interval from $t = 0$ to $t = T_1$ (<1 ms) with the result that capacitor 88 will not be charged. However, since transistor 62 is turned ON at a time $T_1$ to reduce the pulse $C_0$ to 0 volt, the capacitor 88 will be charged negatively from the juncture $Y_0$. At $t = 1$ ms, transistor 30 is turned ON so that pulse B is reduced to zero from E volts. The terminal voltage across capacitor 88 is applied across the base and emitter electrodes of transistor 100 in a direction to turn OFF the same. In other words, −E volts is impressed upon point Y. The charging period of capcitor 88 is shown by the shaded portion of curve $IC_{88}$ in FIG. 3. During this interval, the charging current of the capacitor 88 creates a negative trigger signal potential that turns OFF transistor 100.

At $t = T_1$, the negative trigger signal appears at point Y to turn OFF transistor 100 with the result that transistor 116 is turned ON to light red indicating lamp 118 thus displaying an over exposure condition.

Pulse signals B and C impressed upon terminals 94 and 96 are compared with each other at a juncture $Z_0$ between the capacitor 90 and resistor 84. During the interval between $t=0$ and $t=T_1$ ($<$ 1 ms), since transistor 56 is maintained nonconductive pulse C is equal to 0 volt. Accordingly, the potential of point $Z_0$ connected to terminal 96 through resistor 84 is also zero. Since at $t = T_1$ transistor 30 is OFF, pulse B has a value of E volts. Accordingly, capacitor 90 will be charged such that its terminal on the side of point $Z_0$ will be negative. At $t = T_1$, the pulse changes to E volts so that the capacitor 90 discharges through resistors 84 and 28 and source 22. At $t = 1$ ms, since pulse B becomes to 0 volt, the capacitor 90 is now charged with its $Z_0$ side positive. This condition persists until $t = 30$ ms is reached. During this interval, since no trigger signal appears on point Z, the operation of the flip-flop circuit 112 will not be inverted whereby red lamp 118 continues to light.

At a time $t = 30$ ms, the operation of the astable multivibrator 18 is reversed to turn OFF transistor 4. Thus, the output pulse A is increased to E volts and transistor 38 is rendered ON through resistor 34. The conduction of transistor 38 short circuits the capacitor 42 of the time constant circuit thereby resetting the automatic exposure control circuit 36. Thus, the operation of the automatic exposure control circuit 36 is completely interrupted during the interval between $t = 30$ ms and $t = 60$ ms. This interval is equal to the erasion period during which points $X_0$ and $Z_0$ assume 0 volt whereas point $Y_0$ assumes E volts so that the operation of the flip-flop circuit 112 would not be reversed thus maintaining the lighted condition of red lamp 118. At $t = 60$ ms, the operation performed at $t = 0$ is repeated again but the flip-flop circuit 112 is applied with a signal alone that turns OFF transistor 100. As a result, the flip-flop circuit 112 maintains transistor 100 in its nonconductive state and lamp 118 in its lighted state.

Figure 4:
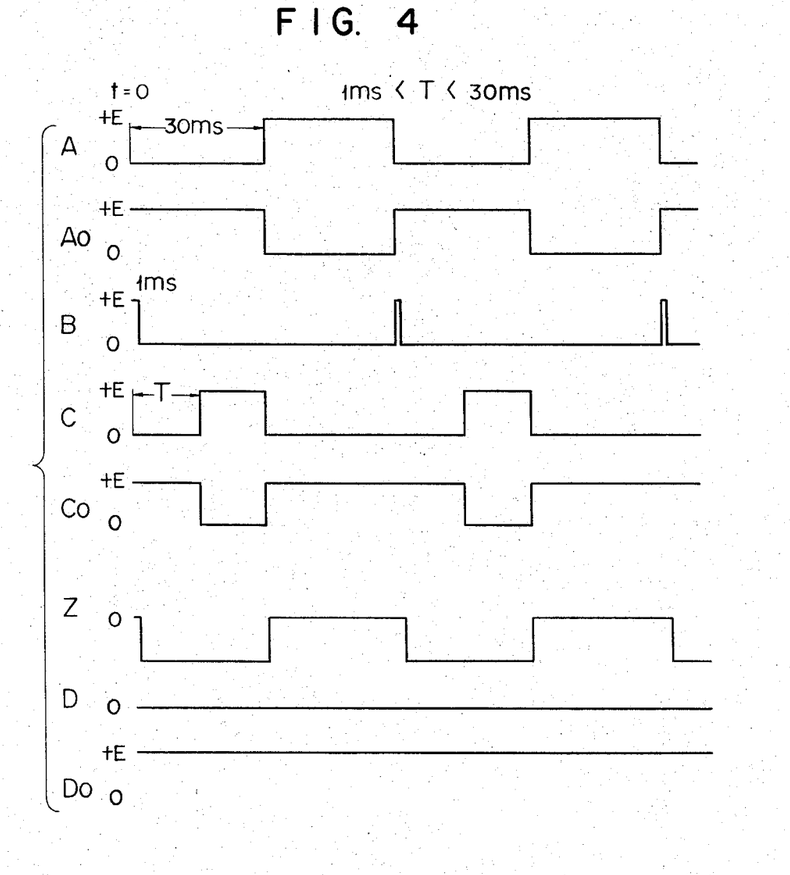

The operation of the apparatus where the brightness of the object falls in the range of the adequate exposure conditions that is the case wherein the widths T of pulses C and $C_0$ to satisfy an equation 1 ms$<T<$30 ms will be described hereunder with reference to FIG. 4. Under these conditions, the output pulses A, $A_0$, B, C and $C_0$ and the potentials at points Z, D and $D_0$ shown in FIG. 1 change as shown in FIG. 4 whereby green lamp 124 is lighted continuously indicating that the exposure condition is adequate.

More particularly, since pulse $A_0$ equals E volts during the interval between $t = 0$ and $t = 30$ ms, capacitor 86 is charged with its terminal 92 positive and moreover since at $t = T$ the pulse changes from 0 to E volts to apply E volts to point X thereby discharging capacitor 86 through resistors 6 and 82 and source 22, the potential of point X would not be changed to negative. Similarly, the potential of point Y would not be changed to negative because pulse B has a value of 0 volt at $t = 1$ ms and pulse $C_0$ is reduced to 0 volt at $t = T$. On the other hand, since during the interval between $t = 0$ and $t = T$ (1 ms$<T<$30 ms) transistor 56 is maintained OFF thus reducing pulse C to 0 volt, the potential of point $Z_0$ is equal to zero and pulse B has a value of E volts during the interval of from $t = 0$ to $t = 1$ ms. As a result, capacitor 90 is charged with its terminal 94 positive. At $t = 1$ ms, the pulse is reduced to 0 volt from E volts and the voltage across capacitor 90 is applied between the base and emitter electrodes of transistor 102 in a direction to turn OFF the same, that is with point Z negative, thereby turning OFF transistor 102. As a result, transistor 122 is turned ON to light green lamp 124 thereby indicating that the exposure condition is adequate. Then the photographer can depress the release button to close switch 66 whereby the output pulse $C_0$ of the automatic exposure control circuit 36 turns ON the transistor 68 to drive the shutter driving electromagnet 70. Thus the picture is taken under the adequate exposure condition.

Figure 5:
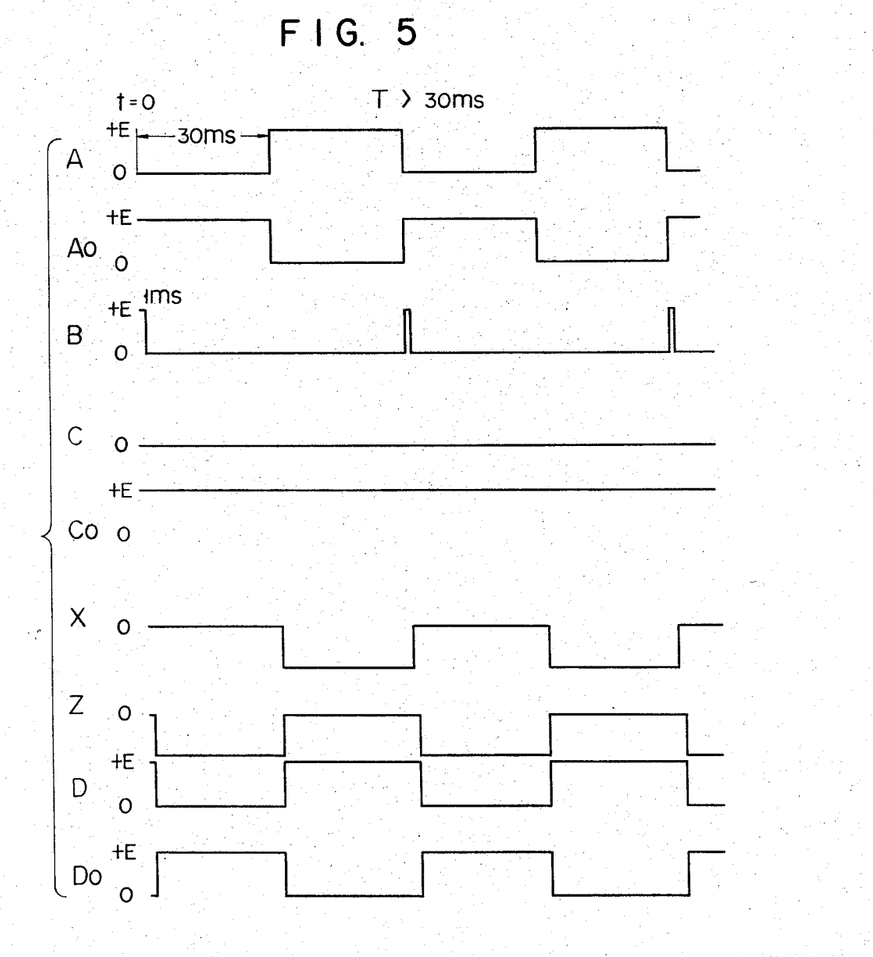

Now a case wherein the brightness of the object is low causing under exposure condition and requiring longer exposure time which accompanies the risk of camera shake, that is a case wherein $T>$30 ms will be considered hereunder with reference to FIG. 5. In this case, output pulses A, $A_0$, B, C and $C_0$ and the potentials at points X, Z, D and $D_0$ shown in FIG. 1 change as shown in FIG. 5. The operation of the flip-flop circuit 112 is reversed alternately by the negative trigger signals alternately produced at points X and Z to alternately flicker lamps 118 and 124. More particularly, since pulse $A_0$ assumes a value of E volts during the period between $t = 0$ and $t = 30$ ms and since capacitor 86 is charged with its terminal 92 positive, a negative trigger signal appears on point X whereby transistor 100 is turned OFF and transistor 116 ON to light red lamp 118. Under these conditions, since pulse B is equal to E volts and pulse C is also equal to E volts during the interval between $t = 0$ to $t = 1$ ms, no negative signal appears on point Y. Furthermore, since pulse B is equal to E volts and pulse C is equal to 0 volt the capacitor 90 is charged with its terminal 94 positive and no negative signal that turns OFF transistor 102 appears on point Z. At a time $t = 1$ ms, the pulse B is reduced to 0 volt so that capacitor 88 will be charged with its $Y_0$ side positive and terminal 94 negative. Accordingly, capacitor 90 produces a negative trigger pulse on point Z to reverse the operation of the flip-flop circuit 112 thereby turning OFF transistor 102 and ON transistor 122. Accordingly, green lamp 124 is lighted.

At $t = 30$ ms, the operation of the astable multivibrator 18 is reversed to reduce output pulse $A_0$ to 0 volt and increase output pulse A to E volts and this pulse E is applied to the base electrode of transistor 38 through resistor 34 thus turning ON transistor 38. As a result, the automatic exposure control circuit 36 is reset. However, the voltages of the output pulses C and $C_0$ are not varied.

In this manner, in the case where T$>$30 ms, the red and green lamps 118 and 124 are lighted alternately, thus indicating the under exposure condition. Each time the operation of the astable multivibrator 18 is reversed the above described operation is repeated.

In the operation of the embodiment shown in FIG. 1, the apparatus operates repeatedly with the frequency of the output from the astable multivibrator 18 even when the constants of the circuit elements are varied it is not necessary to open and close the source switch 20 each time the circuit constants are varied. For example, when the photoelectric converting element 44 comprises an element of cadmium sulfide (CdS), the exposure time $T$ varies with the resistance of CdS. Further, the exposure time $T$ varies also when the value of the capacitor 42 is varied, but provision of an erasing circuit including transistor 38 permits introduction of the information regarding ASA value, opening of the iris diaphragm and other factors by varying the constants of the elements of respective reference time circuits. All such adjustments can be made while the source switch 20 is held closed.

Furthermore, in the embodiment shown in FIG. 1, lamps 118 and 124 are alternately flickered at the time of giving a camera shake alarm, but it is also possible to cause to flicker only one lamp. This can be accomplished by connecting either one or both of capacitors 126 and 128 across the base and emitter electrodes of transistors 100 and 102 in the flip-flop circuit 112, as shown by dotted lines. Thus, for example, where the camera shake alarm is to be displayed by the flicker of red lamp 118 alone, only capacitor 126 may be used.

Figure 6:
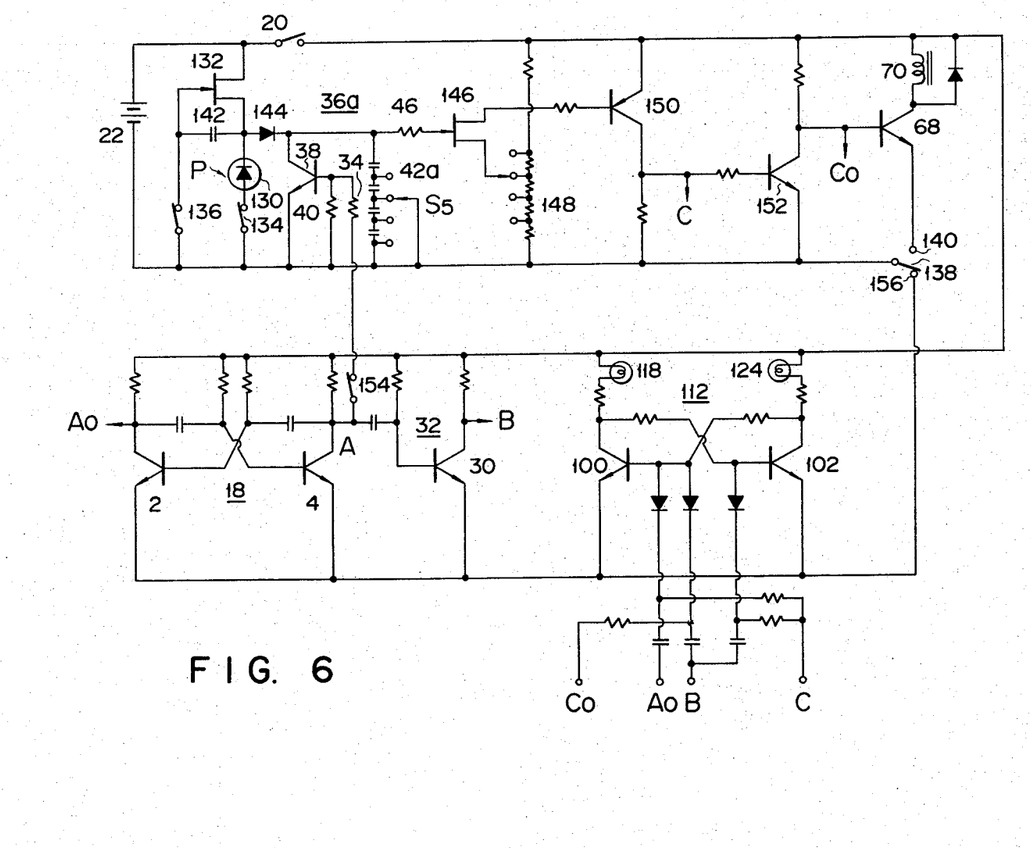
FIG. 6 shows a connection diagram of a modified embodiment of this invention.

The circuit shown in FIG. 6 shows a combination of a light measuring circuit for use in a single lens reflex camera with the apparatus for displaying the exposure conditions. In this case, a solar cell 130 and a field effect transistor 132 are used as the light receiving element of an exposure control circuit 36a. Switches 134 and 136 are connected to be opened in response to the depression of a release button and the raising operation of a reflective mirror (not shown). When a switch 138 is thrown to upper contact 140, the photocurrent generated by the solar cell 130 flows through the field effect transistor 132 to charge a capacitor 142 memorizing the magnitude of the photocurrent so as to charge a variable capacitor 42a through a diode 144 thereby commencing light exposure. This variable capacitor is used for exposure and is interlocked with the raising operation of the reflective mirror or the operation of the shutter front diaphragm so as to turn OFF transistor 38 thereby commencing exposure in the same manner as in FIG. 1. Capacitor 42a is made variable so that it can be used at the time of measuring the light quantity when the iris diaphragm is adjusted to a small opening. At this time, the field effect transistor 146 and succeeding circuit elements are maintained inoperative. The field effect transistor 146 is turned ON at a definite gate voltage by suitably selecting the value of resistor 148 in accordance with the ASA sensitivity of the photographic film used. The interval in which the gate voltage builds up to a value sufficient to turn ON the field effect transistor is determined by the capacitance of variable capacitor 42a and the magnitude of the current from transistor 132 which has stored the exposure current.

Output pulses C and $C_0$ produced by the field effect transistor 146 are amplified by a transistor 150 and are then derived out from the base and collector electrodes respectively of an output transistor 152. Pulse $C_0$ is impressed upon the base electrode of a transistor 68 which is connected in circuit with an electromagnet 70 which acts to hold the rear diaphragm of the shutter but causes the rear diaphragm to start upon deenergization thus completing light exposure.

With the circuit shown in FIG. 6 if the starting of the front diaphragm or the mirror raising operation were interlocked with switch 154 so as to cause it to open, exposure would be commenced concurrently with the opening of switch 154 thereby turning ON transistor 68. Current flows into variable capacitor 42a from transistor 132 in the light measuring circuit, the charging time determining the exposure time of the shutter.

In the embodiment shown in FIG. 6, the exposure control circuit 36a constructed as above described and the indicating device are combined such that the output C is taken out from the collector electrode of transistor 150 and the output $C_0$ is taken out from the base electrode of transistor 68 and that the switch 138 is transferred to contact 140 from contact 156 in response to the operation of the release button. It is possible to control the erasing circuit in accordance with the operation of switch 154 so as to assure the operation identical to that of the circuit shown in FIG. 1. Other elements shown in FIG. 6 and having the same construction and function as before are designated by the same reference letters.

Figures 7, 9:
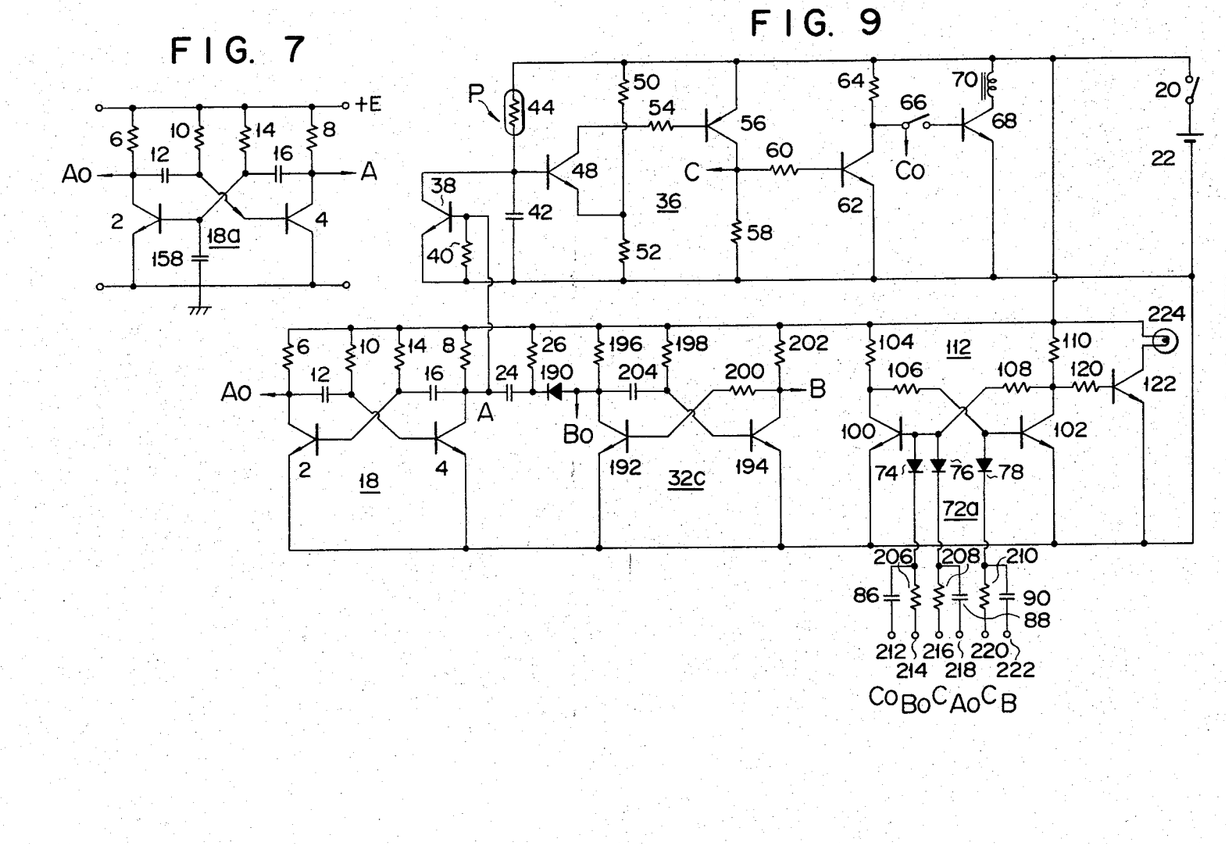
FIG. 7 shows a connection diagram of an improved astable multivibrator.
FIG. 9 shows a connection diagram of still another modification of this invention.

Although, the operation of the astable multivibrator 18 shown in FIG. 1 was described on the assumption that transistor 2 was turned OFF and transistor 4 was turned ON at the instant ($t=0$) when the source switch 20 was closed, generally speaking, it is not certain which one of two transistors 2 and 4 will firstly be turned ON when the source switch 20 is closed. Thus there is a probability that transistor 2 might be turned ON firstly. However, inasmuch as the output $A_0$ from the astable multivibrator 2 is impressed upon the comparator gate circuit 72 the display by lamps 118 and 124 would be inaccurate thereby causing misoperations unless which one of the transistors 2 and 4 is turned ON firstly is determined. FIG. 7 illustrates an improved astable multivibrator 18a that can solve this problem.

In FIG. 7, a capacitor 158 is connected across the base and emitter electrodes of a transistor 2 which is to be positively maintained in the OFF state when the source is connected. Other elements are connected in the same manner as in FIG. 1. The capacitance of this capacitor 158 is selected to be sufficiently smaller than that of capacitor 16 in the time constant circuit made up of a capacitor 16 and a resistor 14. Thus, the capacitor 158 connected across the base and emitter electrodes of transistor 2 maintains transistor 2 in the OFF state for an interval shorter than the oscillation period of the astable multivibrator 18a, so that when the capacitor 158 is charged up, the normal condition of oscillation is initiated wherein when transistor 2 is turned ON, transistor 4 is turned OFF. Thus, capacitor 158 ensures that the astable multivibrator is started when transistor 2 is maintained in the OFF state thereby displaying the correct exposure condition.

Figure 8:
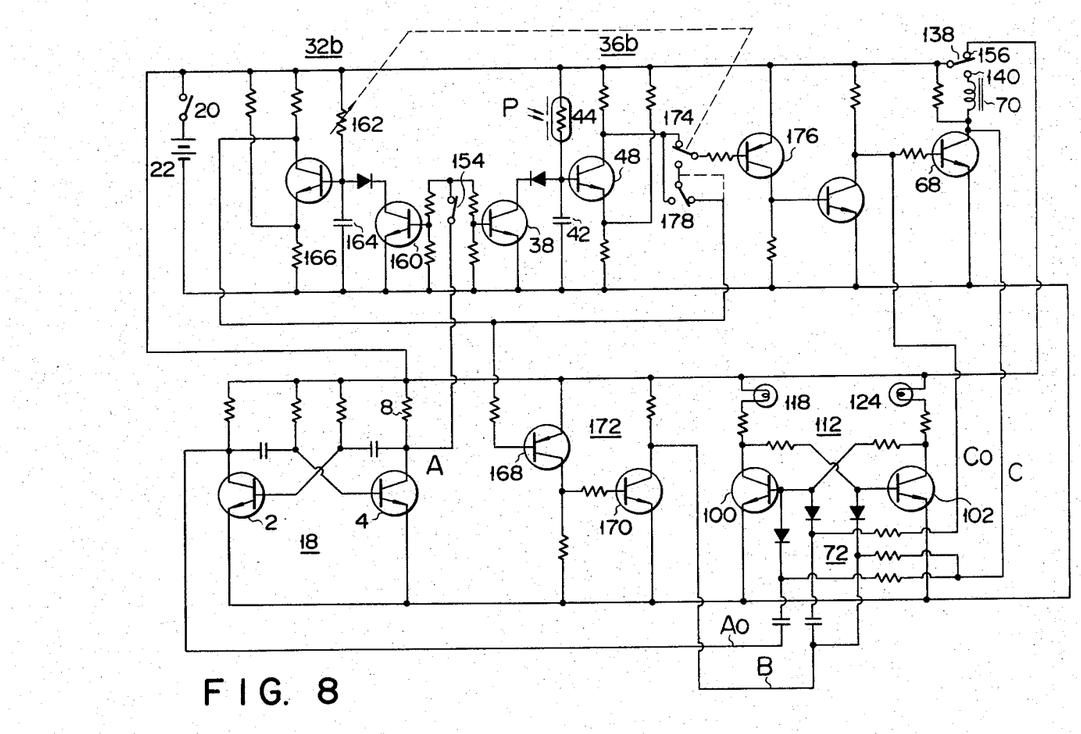
FIG. 8 shows a connection diagram of another modification of this invention.

FIG. 8 shows a connection diagram of a modified apparatus for indicating the exposure condition which is provided with an electric shutter mechanism which preferentially determines the shutter speed. In this modification, the output pulse A from an astable multivibrator 18 is applied to the juncture between a variable resistor 112 and a capacitor 162 which constitute a variable time constant circuit of a pulse generator 32b through a switch 154 and a transistor 160. The output from the variable time constant circuit is applied to the base electrode of a transistor 166 and the collector output B of this transistor is impressed upon the comparator gate circuit 72 after being amplified by an amplifier circuit 172 made up of transistors 168 and 170.

The output from the automatic exposure control circuit 36b is applied from the collector electrode of transistor 48 to the base electrode of transistor 176 through a transfer switch 174 and to one contact of a transfer switch 178. The other contact of transfer switch 174 is connected to the movable contact of the transfer switch 178, whereas the other contact thereof is connected to receive the output pulse B from the pulse generator 32b. The transfer switch 174 is operated together with a shutter dial (not shown) which is interlocked with a variable resistor 162 of a pulse generator 32b. Thus, when the shutter dial is set to the position of "AUTO," the switch 174 is caused to engage the upper contact as shown in FIG. 8 whereas when the shutter dial is set to the position "MANUAL" the switch 174 is thrown to the lower contact. The transfer switch 178 may be operated manually. The pulse generator 32b is designed to generate a reference time signal having a width (about 0.5 ms) equal to the output to the shutter operating time of one two-thousandths sec. when the shutter dial interlocked with variable resistor 162 is set to "AUTO," and to pulse signal B having a width corresponding to the shutter operating time ranging from one two-thousandths to one-fifteenth sec., for example, when the dial is adjusted to the "MANUAL" position. Switches 20, 138 and 154 are interlocked with the operation of the release button of the camera and are operated in the following order. Thus, upon depression of the release button, source switch 20 is firstly closed, then switch 138 is transferred to contact 140 from contact 156 and switch 154 is opened in accordance with the operation of the shutter thereby starting the operation of the apparatus.

When the shutter button is depressed with the shutter dial set to the "AUTO" position, the source switch 20 will be closed. If at this time, transistor 4 were maintained OFF, base bias potentials will be impressed upon the base electrodes of transistors 38 and 160 via resistor 8 and switch 154 so that capacitors 42 and 164 will be short circuited by transistors 38 and 160 respectively thereby maintaining in the inoperative state the circuits 32b and 36b. Then, when transistor 4 is turned ON, transistors 38 and 160 ar turned OFF so that the synchronization of circuits 32b and 36b is started from the instant when transistors 38 and 160 are turned OFF, Accordingly, in the same manner as above described in connection of FIG. 1 respective output pulses $A_0$, B, C and $C_0$ are compared in the comparator gate circuit 72 and the results are displayed on lamps 118 and 124. When the indicator does not show adequate exposure condition the iris diaphragm is adjusted until the green lamp 124 is lighted continuously. This operation gives the preference to the adjustment of the iris diaphragm.

Then, the transfer switch 178 is manually operated to the lefthand contact, the shutter dial is set to the "MANUAL" position and the transfer switch 174 is switched to the lower contact so as to connect the base electrode of transistor 176 to the collector electrode of transistor 48 through transfer switches 174 and 178. Under these conditions it is possible to confirm the shutter operating time and to give the preference to the shutter speed. More particularly, when the transfer switches 174 and 178 are operated in this manner it is possible to make the reference time pulse signal B generated by the pulse generator 32b to correspond to any shutter operating time within a range of from one two-thousandth to one-fifteenth sec. by manipulating the shutter dial. For example, if the shutter speed is set to one one one hundred twenty-fifth sec. a border line will be drawn between the over exposure alarm and the adequate exposure condition corresponding to the shutter time of one one one hundred twenty-fifth sec. Under these conditions, the iris diaphragm is adjusted until the lamp 118 is deenergized and lamp 124 is lighted continuously at which time switch 138 is transferred and the electric shutter is operated whereby it is possible to take a picture at the desired shutter time of one one hundred twenty-fifth sec. In this manner, it is possible to confirm the shutter time and to give preference to the shutter speed.

Above described operation of finding out the switching point for the indication of alarm by the follow-up operation performed by adjusting the iris diaphragm is analogous to the zero method in a metering system in which the pointer of a meter is brought to a zero point. Such an operation can be readily made by an unskilled user. Although in the foregoing description, the iris diaphragm is adjusted after the shutter time has been set to a desired time, this order of setting may be reversed. The latter operation is identical to that which gives preference to the iris diaphragm adjustment but it is possible to confirm the shutter time. When the zero method operation is not perfect although actual shutter time of the electric shutter may be slightly different from the selected shutter time an adequate exposure can be assumed. When the zero method operation is perfectly carried out the pulse widths of the time signals C and $C_0$ produced by the light measuring circuit 36b are equal to that of the time signal B produced by pulse generator 32b, so that even when the transfer switch 178 is thrown to the position shown in FIG. 8 to apply signal B to shutter driving transistor 68, it is possible to take a fine picture.

When the shutter dial is set to the "MANUAL" position, transfer switch 174 is thrown to the lower position and the transfer switch 178 is thrown to the righthand contact as shown in FIG. 8, and the shutter time of the electric shutter is determined by the output pulse B from the pulse generator 32b, so that it is possible to determine the shutter time independently of the output from the light measuring circuit 36b. In this manner, it is possible to set manually all mechanisms just in the same manner as a camera not provided with an electric eye mechanism.

Although in the embodiment shown in FIG. 8, the transfer switch 174 was interlocked with the shutter dial and the transfer switch 178 is associated with the transfer switch 174, it is possible to eliminate transfer switch 178 if the transfer switch were made to operate independently of the shutter dial and the lower contact of the transfer switch 174 were connected as shown by dotted lines.

Further, in the embodiment shown in FIG. 1 red and green lamps 118 and 124 were used to indicate the over exposure condition, the camera shake and the adequate exposure condition, in the modified embodiment shown in FIG. 9, these three conditions are indicated by a single lamp.

More particularly, in the embodiment shown in FIG. 9, an output A from the astable multivibrator 18 adapted to produce a reference time signal which is used as a limiting time, the camera shake is applied to a monostable vibrator 32c through a capacitor 24 and a diode 190. The purpose of the monostable multivibrator 32c is to produce reference time signals $B_0$ and B utilized as the limiting times for alarming the over exposure. The monostable multivibrator 32c is constituted by transistors 192 and 194, resistors 196, 198, 200 and 202 and a capacitor 204. A comparator gate circuit 72a comprises diodes 74 to 78 inclusive, capacitors 86, 88 and 90 and resistors 206, 208 and 210 respectively connected in parallel with capacitors 86, 88 and 90, and is constructed to receive output pulses $C_0$, $B_0$, C, $A_0$, C and B at respective input terminals 212, 214, 216, 218, 220 and 222. The collector electrode of one transistor 102 of a bistable multivibrator 112 is connected to the base electrode of a transistor 122 through a resistor 120 and the collector electrode of transistor 122 is connected in series with an indicating lamp 224. Other component elements are connected in the same manner as in FIG. 1.

The embodiment shown in FIG. 9 is constructed such that when the lamp 224 is extinguished an alarm for the over exposure is indicated, continuous lighting of the lamp indicates an adequate exposure condition whereas a flickering an alarm for camera shake. In the embodiment shown in FIG. 9, when the duration T of the output signals C and $C_0$ from the exposure control circuit exceeds 1 millisecond an alarm for an over exposure condition is given, an adequate exposure range is given when 60 ms$>T>$1 ms and an alarm for camera shake is given when $T>$60 ms.

Figure 10:
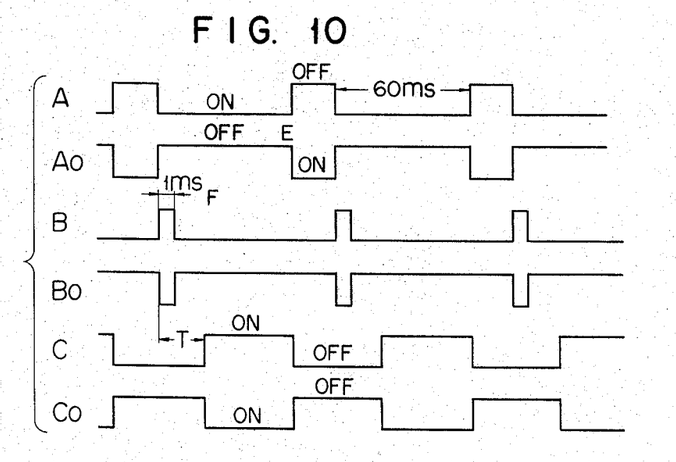
FIGS. 10 and 11 are waveforms useful to explain the principle of the operation of the embodiment shown in FIG. 9.

The waveforms of various output pulses A, $A_0$, B, $B_0$, C and $C_0$ generated by various circuits shown in FIG. 9 are shown in FIG. 10. As shown, the ON interval of pulse A and the OFF interval of pulse $A_0$ are set to be equal to 60 milliseconds respectively. In the comparator gate circuit 72a shown in FIG. 9 since signal $B_0$ acting as a gate voltage is impressed upon a diode 74 and a differential of output signal $C_0$ is applied to this diode as an input so that the values of capacitor 86 and resistor 206 are selected such that when the duration of the signal $C_0$ is less than 1 ms the output from diode 74 is impressed upon the base electrode of transistor 100 whereas when the duration of signal $C_0$ exceeds 1 ms no output appears on the base electrode of transistor 100. Furthermore, since output signal C acting as a gate voltage is impressed upon diode 76 and the differential of output signal $A_0$ is applied to this diode as an input, the values of capacitor 88 and resistor 208 are selected such that only when the duration of output signal C exceeds 60 ms the output of diode 76 is impressed upon the base electrode of transistor 100 at an instant when signal $A_0$ changes from OFF to ON (point E, FIG. 10). In the same manner, since output signal C acting as a gate voltage is impressed upon diode 78 and the differential of this output signal C is applied to diode 78 as an input, the values of capacitor 90 and resistor 210 are selected such that when the duration of output C exceeds 1 ms the output of this diode is applied on the base electrode of transistor 102 at an instant when signal B changes from ON to OFF (point F, FIG. 10) and that no output is produced when the duration of signal C is less than 1 ms.

Figure 11:
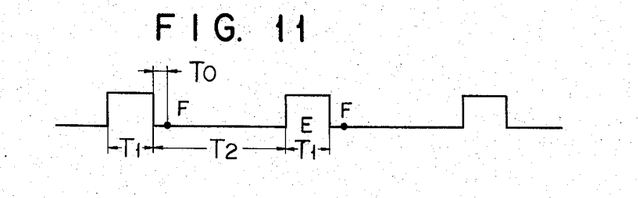

Accordingly, when $T <$ 1 ms, transistor 100 is turned OFF, whereas transistor 102 ON whereby lamp 224 is not lighted indicating an over exposure condition. On the other hand where 1 ms $< T <$ 60 ms, since transistor 102 is turned OFF so that transistor 122 is turned ON thus lighting lamp 224 indicating an adequate exposure condition. Where $T >$ 60ms transistors 100 and 102 are alternately turned ON and OFF. Thus, transistor 100 is turned ON at point F, and OFF at point E, FIG. 10. As shown in FIG. 11, the ON period is represented by $T_2 - T_0$ and OFF period by $T_1 + T_0$, where $T_2$ = 60 ms and $T_0$ = 1 ms. Since $T_1$ corresponds to the interval in which the erasing transistor 38 (see FIG. 9) becomes perfectly ON it is essential that $T_1 >$ 30 ms or more. Erasing transistor 38 is driven by the output pulse A to be repeatedly turned ON and OFF like output pulse $A_0$. Assuming a value $T_1$ = 30 ms, adequate and inadequate exposure conditions are repeatedly displayed at a period of 90 ms. This permits ready setting of the iris diaphragm opening.

Figure 12:
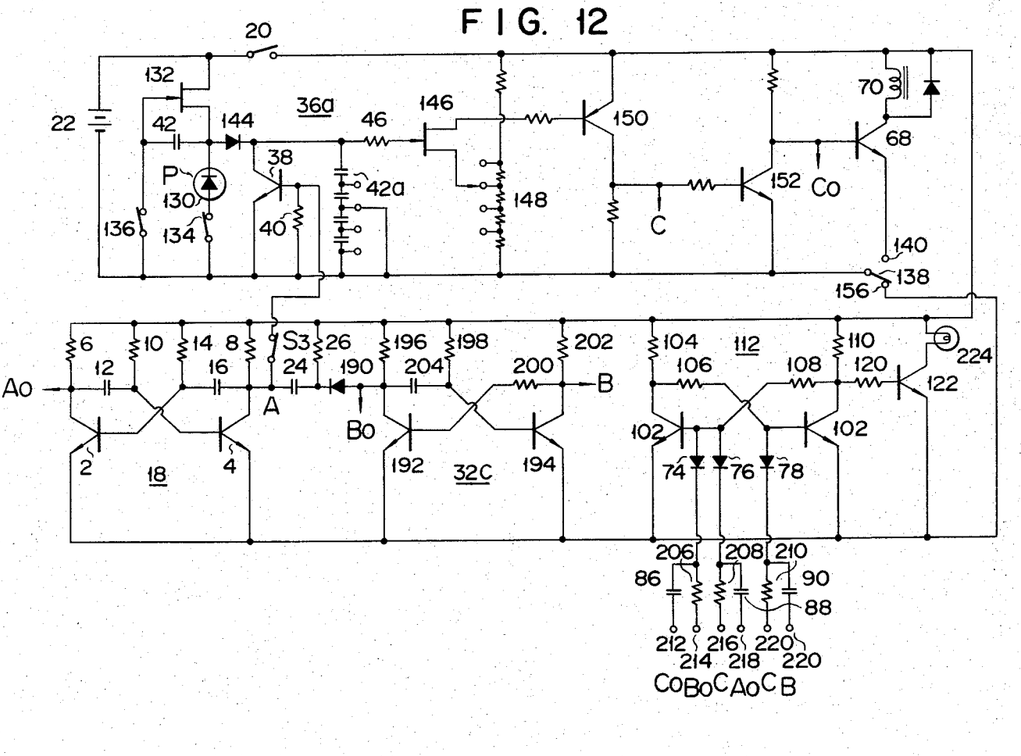
FIG. 12 is a connection diagram of a further modification of this invention.

FIG. 12 shows another modification of this invention wherein the exposure control circuit 36 shown in FIG. 9 is substituted by a control circuit having similar construction to that shown in FIG. 6. With the exposure control circuit 36a, in the TTL (through the lens) type camera similar to that shown in FIG. 6, like the embodiment shown in FIG. 9, it is possible to display not only adequate and inadequate exposure conditions but also over and under exposure conditions with only one lamp 224. As the construction and function of the exposure control circuit 36a have already been described in connection with FIG. 9 and since those of the indicating circuit have already been described in connection with FIG. 9, it is believed unnecessary to repeat them again and corresponding elements are designated by the same reference characters.

What we claim is:

1. Apparatus for indicating exposure conditions of a photographic camera equipped with an electric shutter mechanism, said apparatus comprising a first electric pulse generating circuit which generates a first reference time pulse signal having a pulse width corresponding to a maximum shutter open time at which camera shake may occur, a second electric pulse generating circuit which is driven by the output from said first electric pulse generating circuit for generating a second reference time pulse signal having a width corresponding to a limit of a shutter open time at which an over exposure may occur, an automatic exposure control circuit which operates in synchronism with the output from said first electric pulse generating circuit to open the shutter of said camera at a speed corresponding to the quantity of light received from an object, a comparator gate circuit which compares the width of the output pulse from said automatic exposure control circuit with those of the output pulses from said first and second electric pulse generating circuits, and means responsive to the output from said comparator gate circuit to indicate adequate and inadequate for proper exposure conditions.

2. An apparatus according to claim 1 wherein said first electric pulse generating circuit comprises an astable multivibrator including first and second transistors.

3. An apparatus according to claim 2 wherein said astable multivibrator comprises a first CR time constant circuit including a first resistor connected beetween the base electrode of said first transistor and a source of supply and a first capacitor connected between the base electrode of said first transistor and the collector electrode of said second transistor, a second CR time constant circuit including a second resistor connected between the base electrode of said second transistor and said source and a second capacitor connected between the base electrode of said second transistor and the collector electrode of said first transistor, and a third capacitor connected across the base and emitter electrodes of said second transistor and having a capacitance sufficiently smaller than the capacitances of said first and second capacitors, whereby when said source is connectd to said apparatus, said apparatus commences to operate with said first transistor turned ON whereas said second transistor turned OFF.

4. An apparatus according to claim 1 wherein said second electric pulse generating circuit comprises a first time constant circuit including a first variable resistor and a first capacitor which are connected in series across said source, and a first transistor with its base electrode connected to the juncture between said first variable resistor and said first capacitor so that the conduction interval of said first transistor is controlled by said first time constant circuit whereby the pulse width of said second reference time pulse signal is varied by varying the value of said first resistor.

5. An apparatus according to claim 4 wherein said first resistor is interlocked with a transfer switch which is operated in accordance with the "AUTO" and "MANUAL" set positions of the shutter speed dial of said camera, and wherein said first variable resistor is varied such that at said "AUTO" set position of said shutter speed dial, the value of said first variable resistor corresponds to the maximum shutter speed whereas at said "MANUAL" set position, the pulse width of said second reference time pulse signal can be varied to any desired value.

6. An apparatus according to claim 1 wherein said indicating means comprises a flip-flop circuit made of first and second transistors, third and fourth transistors respectively turned ON and OFF in response to the conduction state of said first and second transistors, first and second indicating lamps of different colours which are connected in series with said third and fourth transistors, respectively, and means to apply the output from said comparator gate circuit to the base electrodes of said first and second transistors such that under an under exposure condition said first and second transistors are turned ON and OFF alternately, that under an over exposure condition one of said first and second transistors is turned ON and that under an adequate exposure condition the other transistor is turned ON.

7. An apparatus according to claim 1 wherein said indicating apparatus comprises a flip-flop circuit made up of first and second transistors, a third transistor which is controlled ON and OFF in accordance with the conduction condition of one of said first and second transistors, a first indicating lamp connected in series with said third transistor, and means to apply the output from said comparator gate circuit to the base electrode of one of said first and second transistors such that under an under exposure condition said first indicating lamp is flickered, that said third indicating lamp is not lighted under an over exposure condition and that under an adequate exposure condition said first indicating lamp is lighted.

* * * * *